United States Patent
Ponzio et al.

(10) Patent No.: US 7,267,296 B2
(45) Date of Patent: Sep. 11, 2007

(54) METHOD AND APPARATUS FOR WINDING MULTI-POLE STATORS WITH TERMINATION HOOKS

(75) Inventors: Massimo Ponzio, Barberino V. Elsa (IT); Fabrizio Cresti, Tavarnelle Val di Pesa (IT)

(73) Assignee: ATOP, SpA, Barberino, V. Elsa (FI) (IT)

( * ) Notice: Subject to any disclaimer, the term of this patent is extended or adjusted under 35 U.S.C. 154(b) by 484 days.

(21) Appl. No.: 10/631,099

(22) Filed: Jul. 31, 2003

(65) Prior Publication Data

US 2005/0022368 A1   Feb. 3, 2005

(30) Foreign Application Priority Data

Aug. 2, 2002  (EP) ................... 02425513

(51) Int. Cl.
  *H02K 3/46*  (2006.01)
  *H02K 3/00*  (2006.01)
(52) U.S. Cl. .................... 242/433.3; 242/433
(58) Field of Classification Search ................ 242/433, 242/433.2–433.4; 29/596, 597
See application file for complete search history.

(56) References Cited

U.S. PATENT DOCUMENTS

| | | | |
|---|---|---|---|
| 3,713,208 A * | 1/1973 | Doyle | ................ 29/597 |
| 4,633,110 A | 12/1986 | Genco et al. | |
| 4,827,601 A | 5/1989 | Banner | |
| 5,606,208 A * | 2/1997 | Sakashita et al. | ............. 310/71 |
| 5,755,021 A | 5/1998 | Beakes et al. | |
| 5,915,643 A * | 6/1999 | Dolgas | ................. 242/433 |
| 5,947,404 A * | 9/1999 | Dolgas et al. | ........... 242/433.3 |
| 6,145,772 A | 11/2000 | Kleinschrodt et al. | |

* cited by examiner

*Primary Examiner*—Gene O. Crawford
*Assistant Examiner*—Evan H. Langdon
(74) *Attorney, Agent, or Firm*—Simpson & Simpson, PLLC

(57) ABSTRACT

A method and apparatus for winding multi-pole stators formed by a sheets stack ferromagnetic core, having a plurality of radially extending poles defining grooves between them. Said wireis wound about said pole extensions, spooled by a flier, and guided by shrouds, which move radially with respect to said stator overlapping the respective pole extension. The shroud) is equipped with a housing suitable for receiving said hook, so that said shroud) makes a guide for said wire on said hook. Said flier is rotated about its own axis in order to deposit said wire onto said hook. Then said shroud is withdrawn up to disengaging said hook from said housing. In case said wire must form a loop or "alpha" about said hook, after withdrawal of said shroud, said hook is shielded by means of a shield in order to force said wire in a chosen position and to slide on said shield during a backwards movement of said flier.

9 Claims, 10 Drawing Sheets

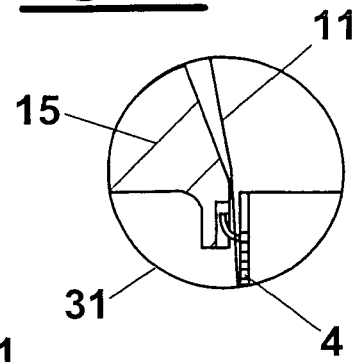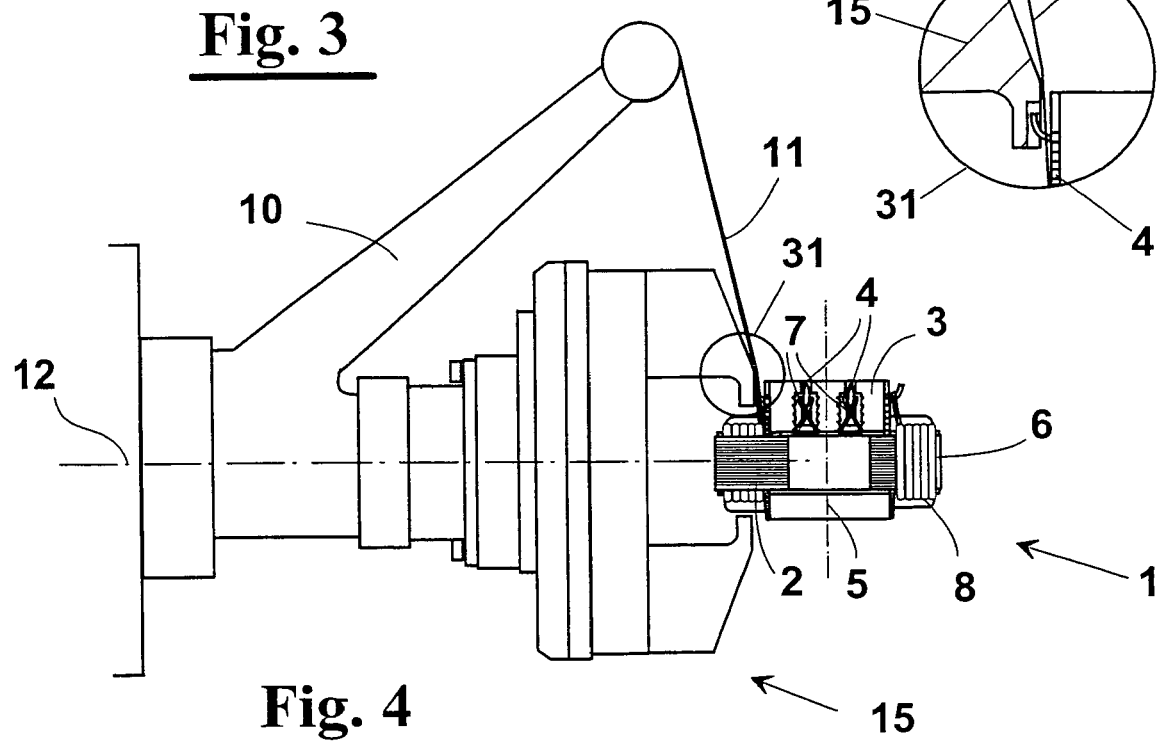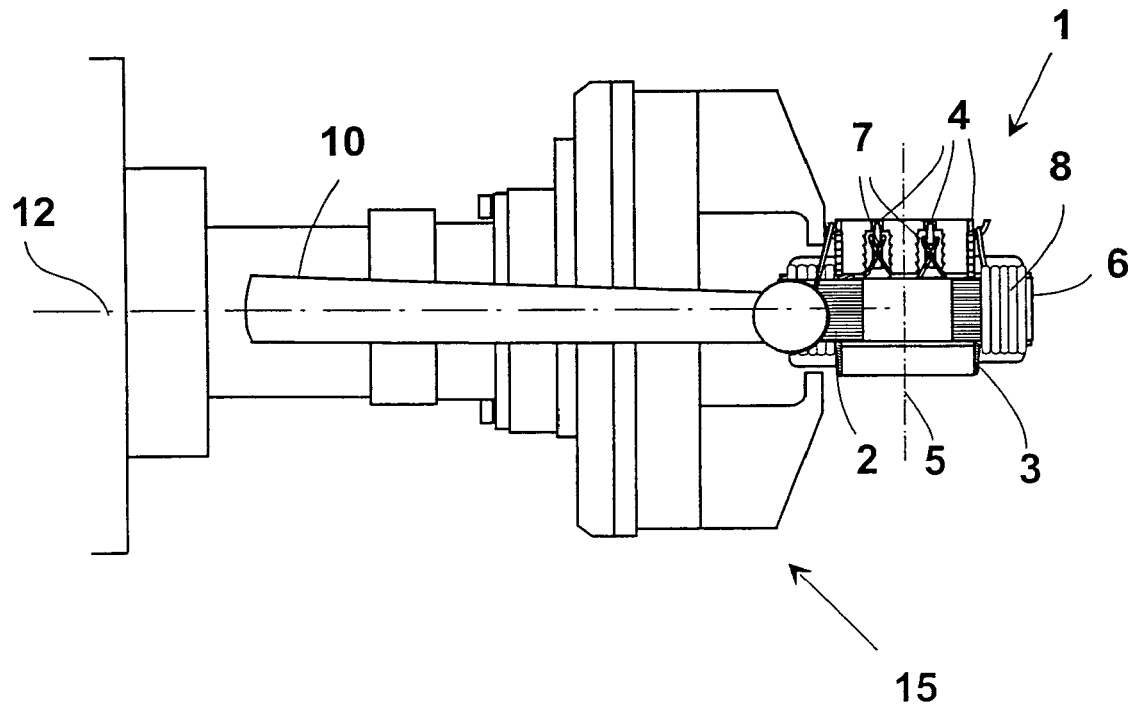

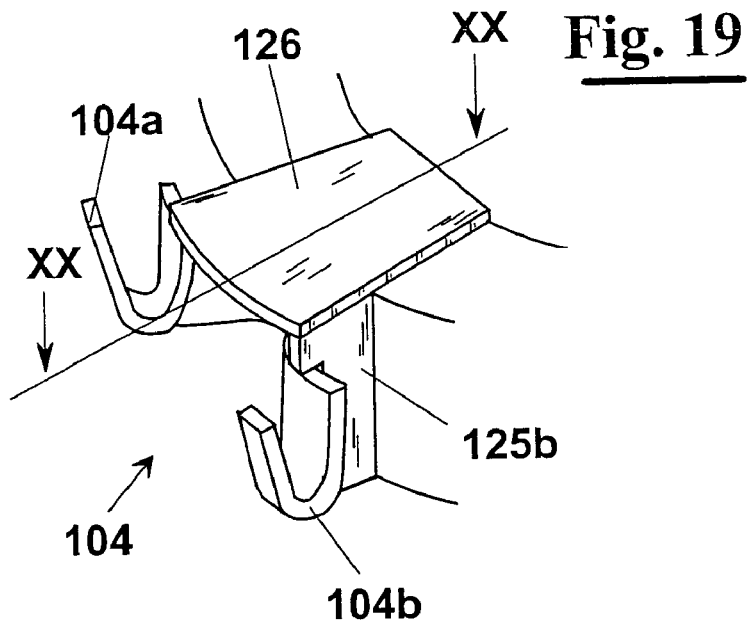
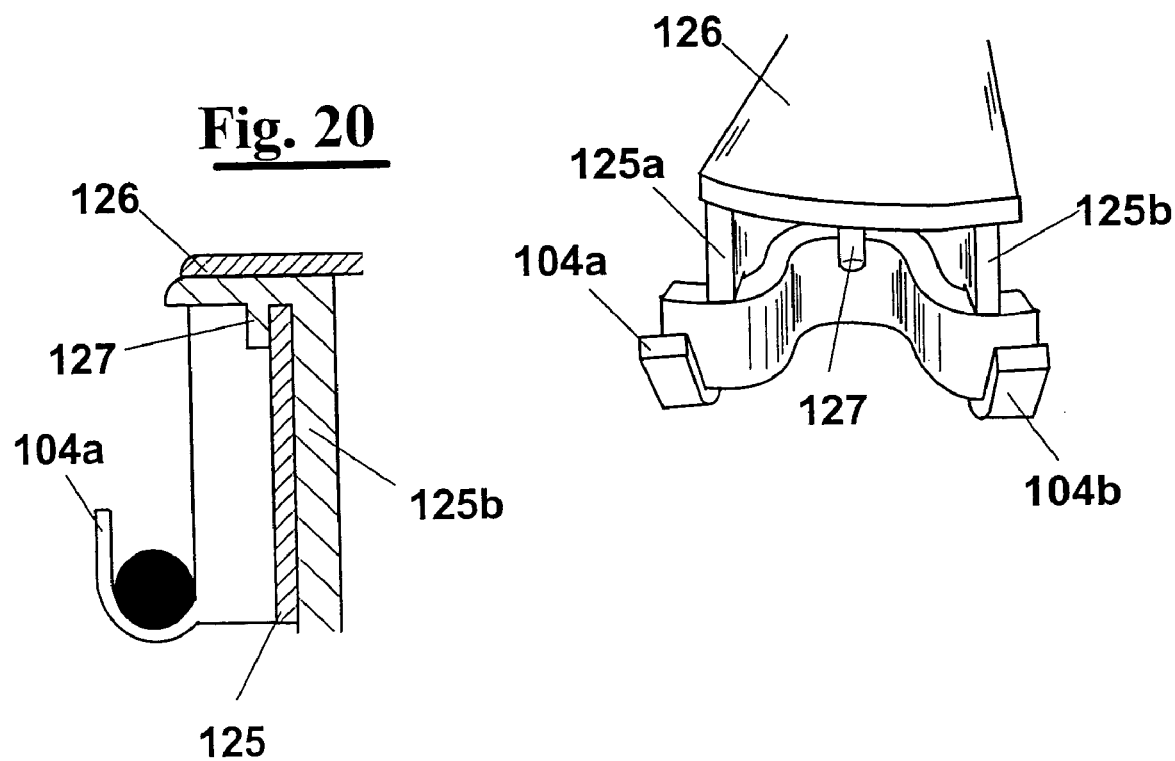

METHOD AND APPARATUS FOR WINDING MULTI-POLE STATORS WITH TERMINATION HOOKS

FIELD OF THE INVENTION

The present invention relates to the field of stator winding machines, and precisely it relates to a method for winding multi-pole stators with termination hooks. Furthermore, the invention relates to an apparatus that carries out this method.

BACKGROUND OF THE INVENTION

As known, multi-pole stators exist formed by a substantially star-shaped stack of sheets featuring a plurality of poles extending from a tubular core. The stators of this type are suitable for coupling with an inner concentric armature or outer ring armature. they are common in brushless motors.

The peripheries of the poles, or pole extensions, form substantially a cylinder with a plurality of slits parallel or oblique with respect to the axis of the stator. The peripheries of the poles are connected to the core by means of pole walls that define corresponding grooves, accessible through the slits. The grooves have to be filled with insulated lead wire, by creating coils spooled about the pole walls.

At winding, where possible, the wire must pass necessarily through the slits for entering the grooves, and has to be guided to avoid collisions against the edges of the grooves. To this purpose, winding machines exist having a winding arm, or flier, which rotates causing the wire to follow a circular trajectory thus creating the coil of each pole. The wire follows the circular trajectory while it is guided in the slits by means of special winding forms.

One of the winding forms has the shape of a shroud and allows the wire to pass the pole making substantially a double chute guide that deviates the wire from its own circular trajectory and brings it to wind about the pole wall. The shroud normally is mounted on a support shaft co-axial to the flier and is movable towards/away from the axis of the stator for laying uniformly the wire along the pole wall.

By rotating, at winding, about the support shaft of the shroud the flier has an end that moves in orbital position both with respect to the pole being wound and to the shroud that guides the wire into the grooves.

Each portion of wire wound about one or more poles has at least two ends. In order to assure an electrical contact, which is necessary for the passage of the induction current that causes the armature to rotate and the motor to work, the ends must be connected to hooks; then a step of welding the hooks follows in order to dissolve the insulating film of the wire and to form an electrical contact. The hooks, in turn, when the motor is assembled are connected to the current supply circuits for the operation of the motor. The hooks are integrated or implanted in a terminal board, which is a body of plastic material that insulates the inner and front faces of the stack of sheets thus forming the ferromagnetic core of the stator.

After winding each coil, the wire is connected to one of the hooks, usually according to two possibilities:
a) the wire is wound one turn about the hook and then another coil is wound on another pole; in this case, the wire engages the hook;
b) the wire is cut at the hook, and the end can be, for a small portion, bent about the hook; at the same hook another end is arranged from which starts a coil.

For the case b) a termination device is provided that grips the wire, cuts it at the hook and carries out the termination step of the next coil wire end.

For the case a) there are many cases:
the wire engages the hook creating an overturned "U", or an "Ω", or an arch;
the wire forms a loop or an "alpha" about the hook.

For the case a) there are presently no methods quickly and effective for engaging the wire with the hook without the use of further instruments that grip the wire.

SUMMARY OF THE INVENTION

It is therefore a feature of the present invention to provide a method for winding outwardly spooled multi-pole stators having hooks, wherein the wire is caused to follow predetermined trajectories with the aid of selective rotations of the flier.

It is another feature of the present invention to provide an auxiliary device that causes the wire to be fixed to the hooks of a multi-pole stator in co-operation with the flier.

It is another feature of the present invention to provide such an auxiliary device that supports the hooks in the winding and termination steps.

These and other features are accomplished with one exemplary method, according to the present invention, for winding multi-pole stators; wherein the stators are formed by a sheets stack ferromagnetic core, having an axis, a plurality of radially extending poles defining grooves between them, and a terminal board that coats in part the core and has a plurality of hooks; wherein the wire is wound about the pole extensions, spooled by a flier, and guided by shrouds, which move radially with respect to the stator overlapping the respective pole extension; wherein before and/or after winding, fastening operations are provided of the wire about the hooks by the flier; one characteristic of which is that it comprises the steps of:
prearranging a shroud equipped with a housing suitable for receiving the hook;
winding a coil about the pole and moving the shroud towards the hook for completing winding;
overlapping the shroud and the hook which enters said housing so that the shrouds makes a guide for the wire on the hook;
rotating the flier about its own axis in order to deposit the wire onto the hook;
withdrawing the shroud up to disengaging the hook from the housing; and,
indexing the stator and winding a next coil.

In case the wire must form a loop or "alpha" about the hook, in particular the steps are provided of:
a first rotation of the flier about its own axis in order to deposit the wire onto the hook;
withdrawing the shroud up to disengaging the hook from the housing;
shielding the hook by means of a shield in order to force the wire in a chosen position; and,
a second rotation of the flier about its own axis opposite to the first rotation, in order to form a loop, substantially an alpha-shaped loop, about the hook, owing to the wire to slide on the shield.

In particular, for generating the loop, after the first rotation of the flier for depositing the wire onto the hook, the shroud should preferentially disengage the hook for allowing the shield to arrange itself between the shroud and the hook same. Then, the wire stretched by the flier is forced to pass under the shield with the result that the wire forms the loop without disengaging from the hook.

Advantageously, the hooking step can be aided by indexing the stator about its own axis.

A machine for winding multi-pole stators, wherein the stators are formed by a sheets stack ferromagnetic core, having a axis, a plurality of radially extending poles defining grooves between them, and a terminal board that coats in part the core and has a plurality of hooks, comprises at least a flier and a shroud that moves radially with respect to the stator overlapping the respective pole extension.

In particular, said machine comprises:
a shroud, having a face oriented towards the stator where a housing is made suitable for receiving a portion of the hook, to make a guide for the wire on the hook.

In case the stator provides that the wire forms a loop or "alpha" about the hooks, it has further:
a shield movable between a disengaged position and a position engaged between the hook and the shroud, suitable for keeping the wire at a forced position, to prevent the wire from leaving the hook during a backwards movement of the flier.

Preferably, the shield, which covers the hooks during the termination, has a cylindrical shape co-axial to the stator, and moves axially.

Advantageously, the shield of cylindrical shape is optionally and peripherally equipped with at least one locking element that locates at a hook of the stator during termination.

Preferably, the shield has a plurality of locking elements in the form of teeth oriented towards below for engaging respective hooks. The locking elements supports the hooks preventing them from deformation and break owing to bending forces or hits in the winding and termination steps.

In an alternative exemplary embodiment, the locking elements comprise a central stiffening portion that in use is positioned behind the hooks and two side portions suitable for blocking the hooks with respect to the stator and guiding the wire in the winding and termionation step.

Furthermore, the locking element can be equipped with a protrusion or "tooth" that prevents the hook from moving radially when pulled. This way, it is possible to avoid in the the actions generated by the wire on the hook which can cause it to move away from the correct position or damaging it termination step.

Alternatively, the shield may have open shape, for example flat, but with at least a rounded edge, for allowing the wire to slide and preventing in the hooking step the wire from being damaged by the shield.

BRIEF DESCRIPTION OF THE DRAWINGS

Further characteristics and the advantages of the method and the device according to the invention for winding multi-pole stators will be made clearer with the following description of an exemplary embodiment thereof, exemplifying but not limitative, with reference to the attached drawings, in which like reference characters designate the same or similar parts throughout the figures of which:

FIGS. 2-4, 6-7, 9 and 11 show an elevational side view of the succession of winding steps of the multi-pole stator and the device that carries out these steps, according to the embodiment of FIG. 1.;

FIGS. 2A and 2B show two possibility of engagement of the wire on the hook;

FIG. 3A shows in detail the step where the hook engages the housing of the wire guiding shroud;

FIG. 19 shows a perspective view of a detail of a locking element of the shield of FIG. 17 in engagement position with a hook of the multi-pole stator of FIG. 18;

FIG. 20 shows a cross sectional view according to arrows XX-XX of a locking element of the shield in an engagement position with the hook of the multi-pole stator;

FIG. 21 shows in a perspective elevational front view the locking element of the shield in engagement position with the hook of the multi-pole stator, showing the position of the tooth of the locking element relative to the hook of the stator.

DESCRIPTION OF THE EMBODIMENTS

Figure 1:
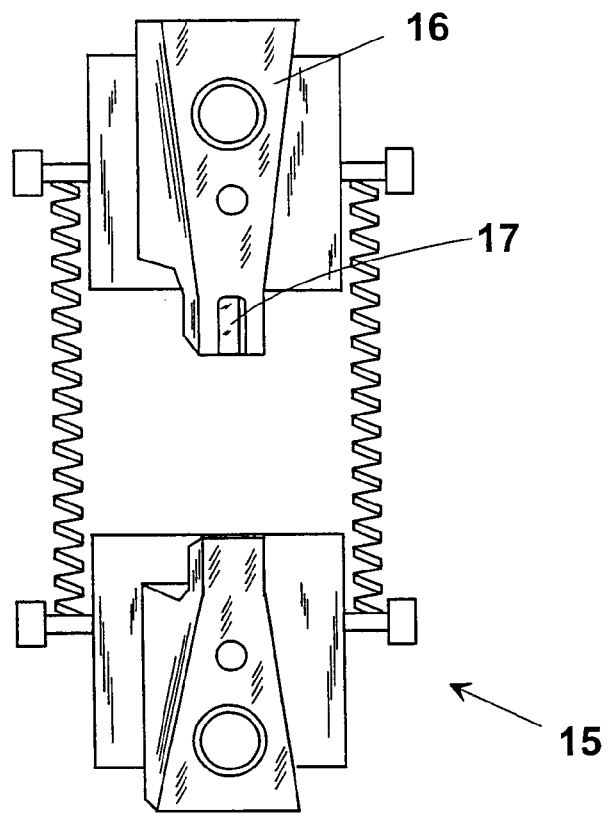
FIG. 1 shows a perspective view of a shroud, according to one exemplary embodiment of the present invention.

With reference to the exemplary embodiment assessment in FIGS. 2-11, an outwardly spooled multi-pole stator 1 has a core formed by a stack of ferromagnetic sheets 2, having an axis 5 and a plurality of poles 6 that radially extend defining grooves between them. The stack 2 is in part covered by a terminal board 3 that has a plurality of hooks 4. To each hook 4 is connected an end of the wire spooled about a pole 6, causing the wire to follow a path 7 that engages a hook 4.

Figures 2, 2A, 2B:
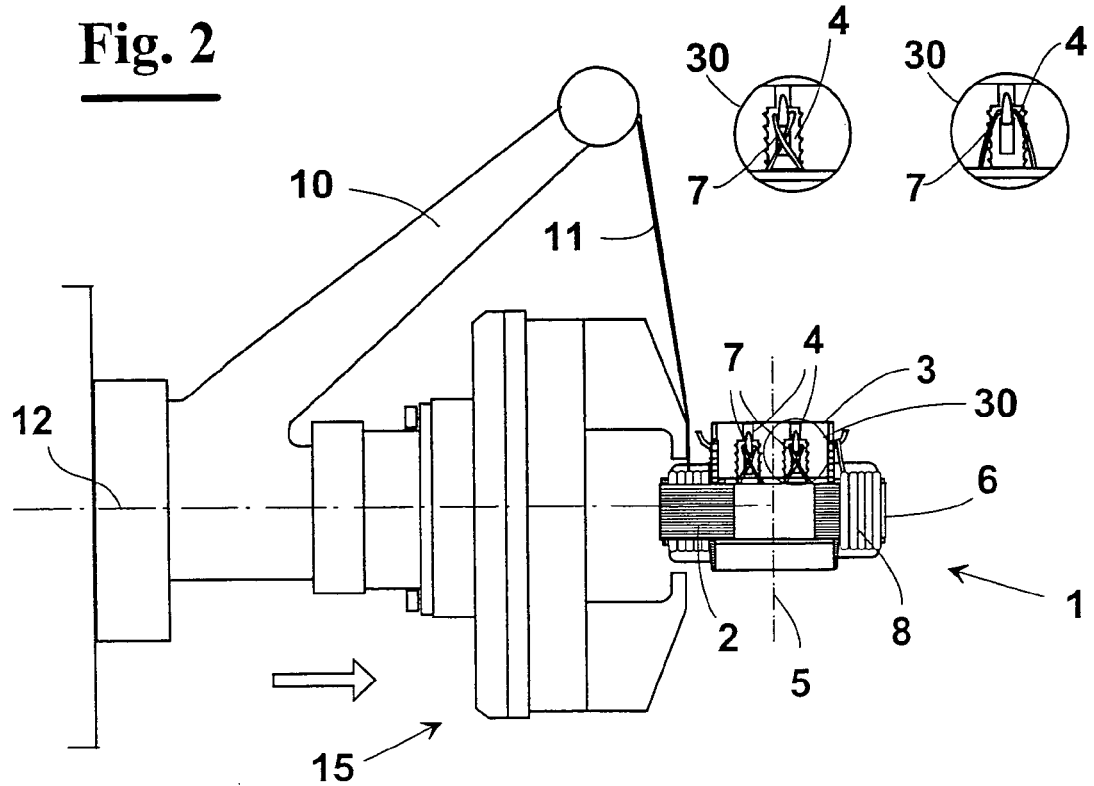

In particular, in FIG. 2A, which is a zoom of an encircled zone 30 of FIG. 2, the wire forms a loop 7, or "alpha", about hook 4. Instead, in FIG. 2B the wire forms substantially an overturned "U", or an "Ω", or a arch about hook 4. This depends by the winding layout of stator 1 and by the structure chosen by the manufacturer.

The winding step is carried out by a flier 10, or winding arm, which spools a wire 11, guided by shrouds 15, about the poles 6 of stator 1. At winding, shroud 15 moves radially with respect to stator 1 overlapping the respective pole 6.

Before and after winding fastening operations are provided of the end of wire 11 to hooks 4 with the aid of flier 10, according to the steps shown in FIGS. from 2 to 11 and described hereinafter.

At first, (FIG. 1) a shroud 15 is arranged having a housing 17 suitable for receiving a portion of hook 4, to make a guide for wire 11 on hook 4.

On shroud 15 a coil 8 is wound on pole 6, with the aid of a reciprocation of shroud 15 same towards and away hook 4 up to the end of winding. Eventually, the shroud approaches the hook so that a portion of hook 4 enters housing 17 of shroud 15 and wire 11 can be guided on hook 4.

To this end, a first rotation of flier 10 is made about its own axis 12 in order to deposit wire 11 on hook 4; then, shroud 15 is withdrawn up to disengaging hook 4 from housing 17.

If wire 11 must engage hook 4 according to an "Ω" or an overturned U, then stator 1 is indexed after that starts winding about another pole 6.

Alternatively, in case of an "alpha" loop, a shield 20, shields hook 4 in order to keep wire 11 at a forced position. This way, a second rotation of flier 10 about its own axis 12, opposite to the first rotation, forms a loop 7, substantially an alpha-shaped loop, about hook 4, since the wire 11 slides on shield 20. Finally, as the loop is formed, stator 1 is indexed and a next coil 8 is wound; the latter step is not shown in this figure.

Figure 5:
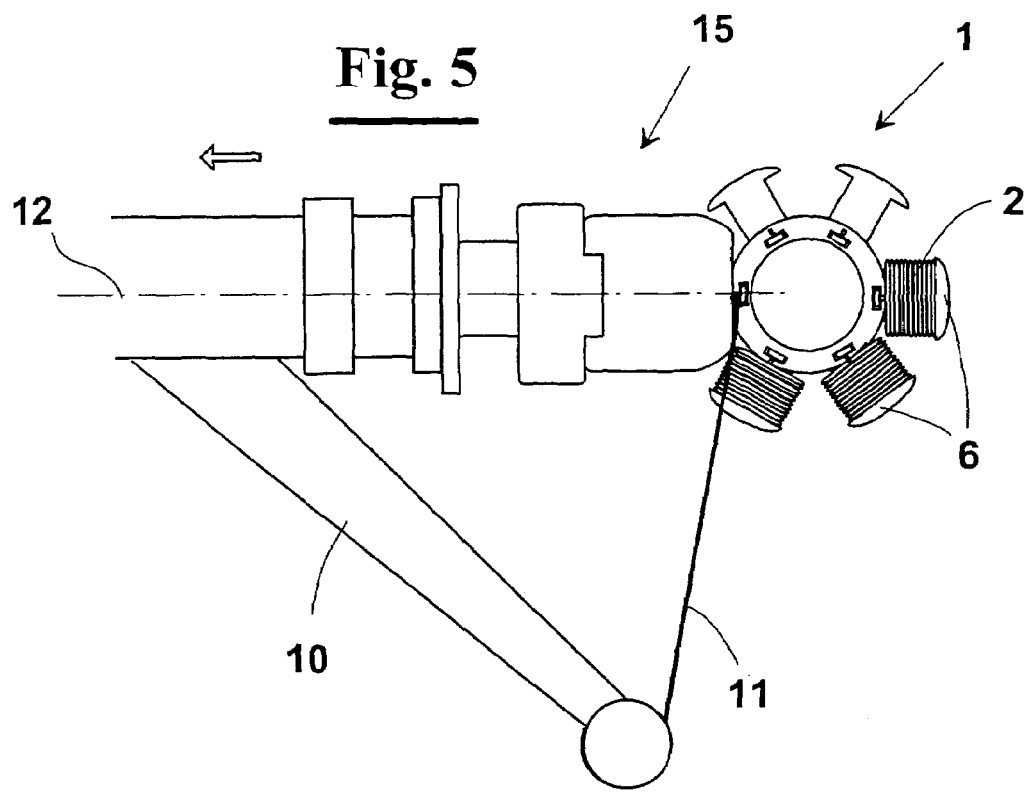
FIGS. 5, 8 and 10 are top plan views corresponding to FIGS. 4, 7 and 9.
Figure 6:
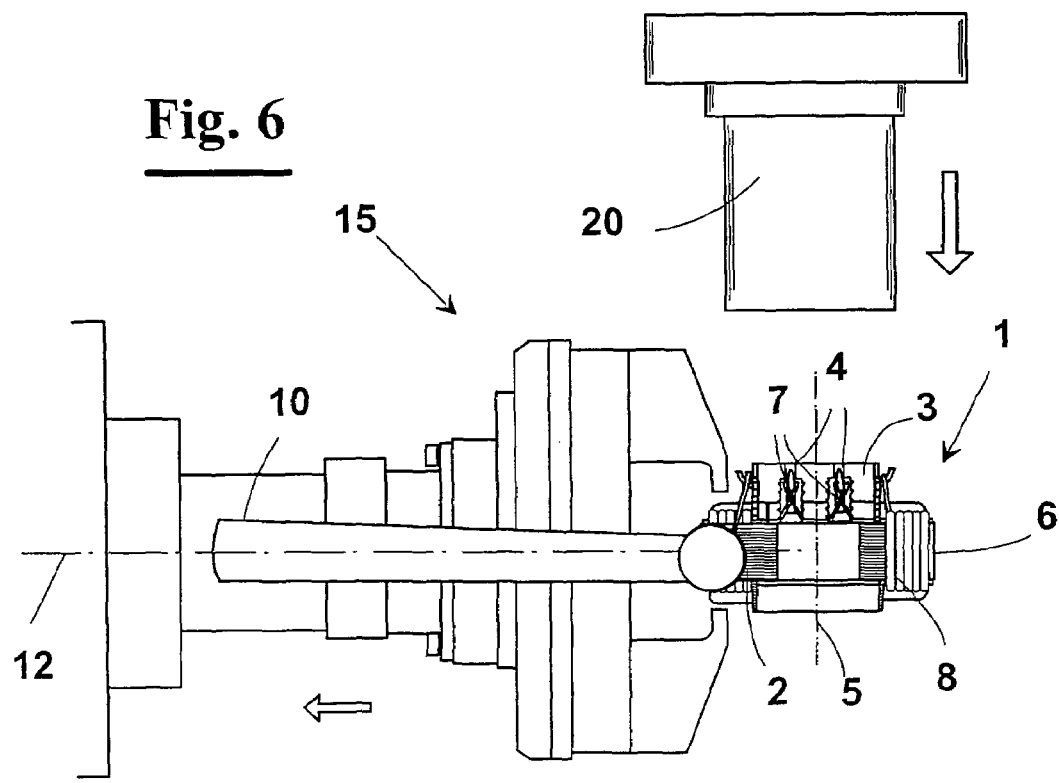
Figure 7:
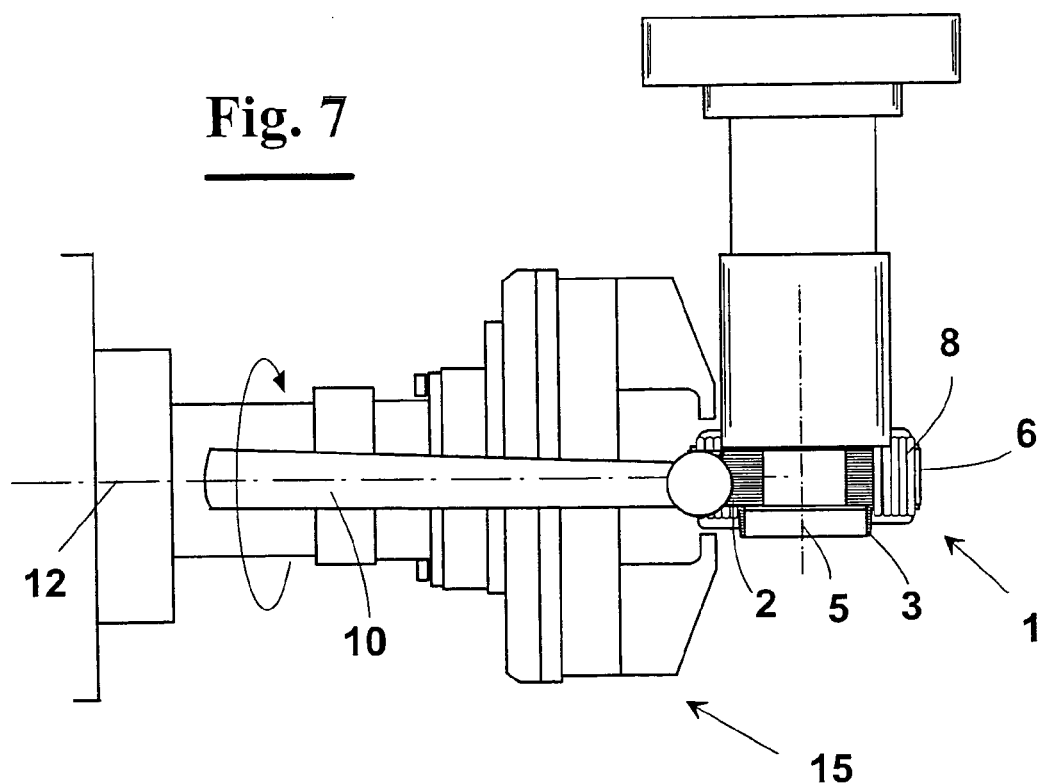
Figure 8:
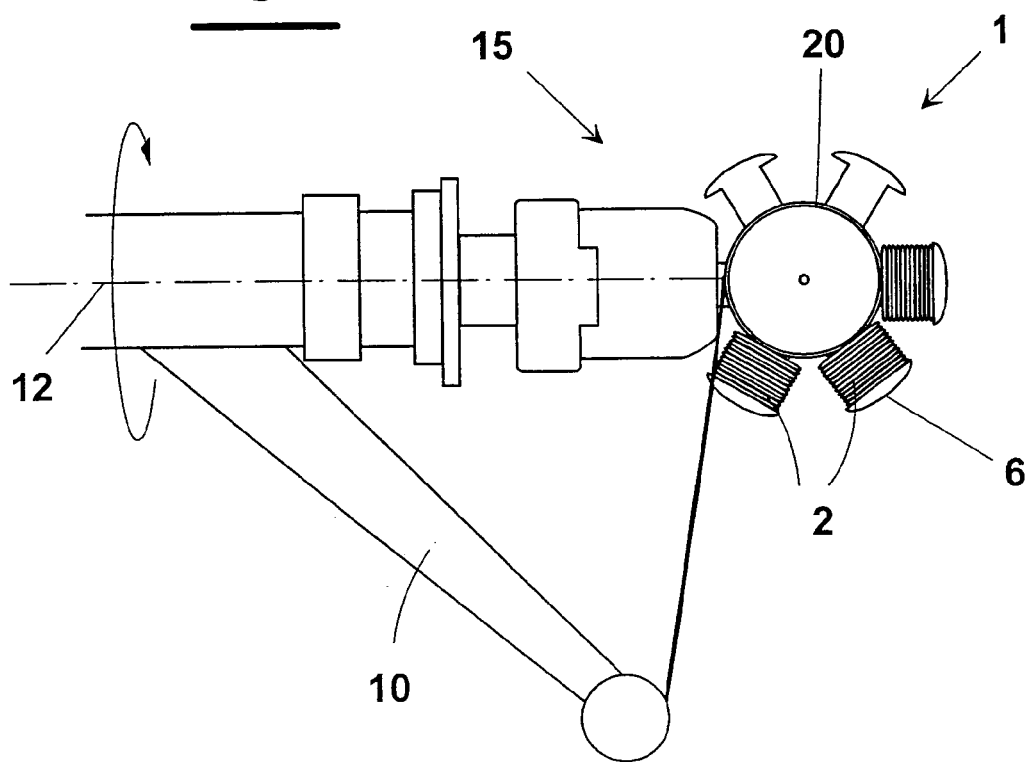
Figure 9:
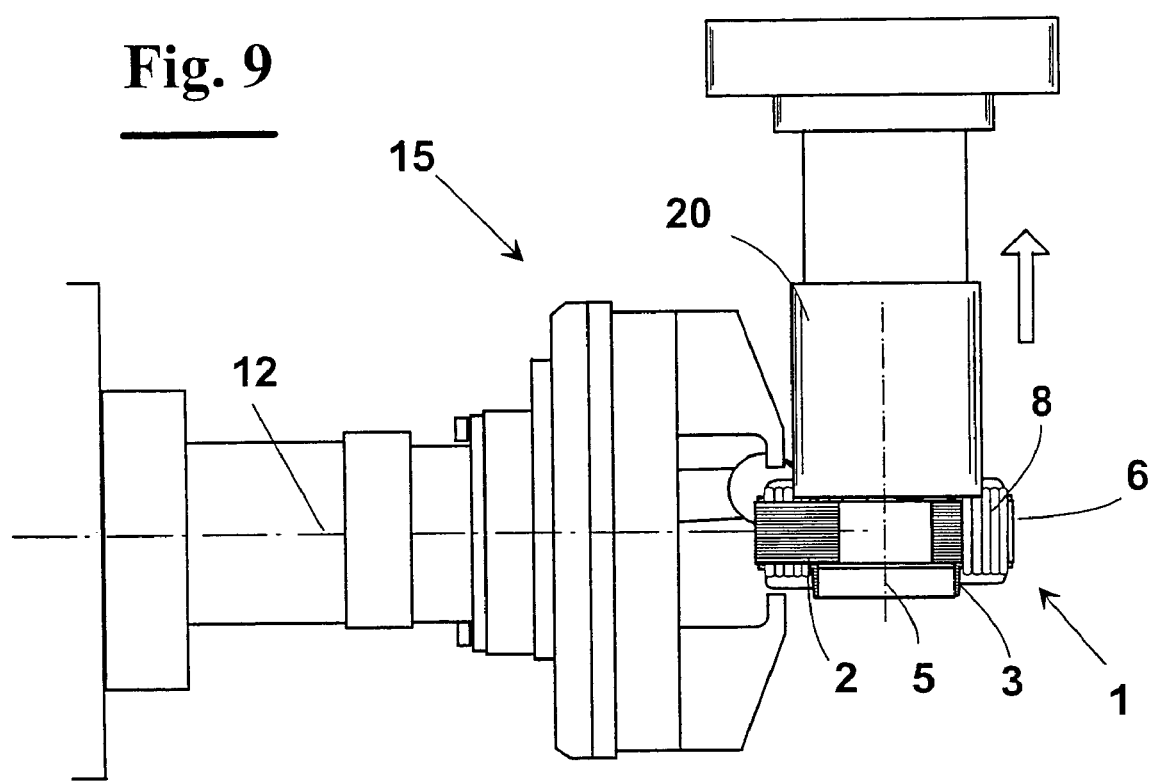
Figure 10:
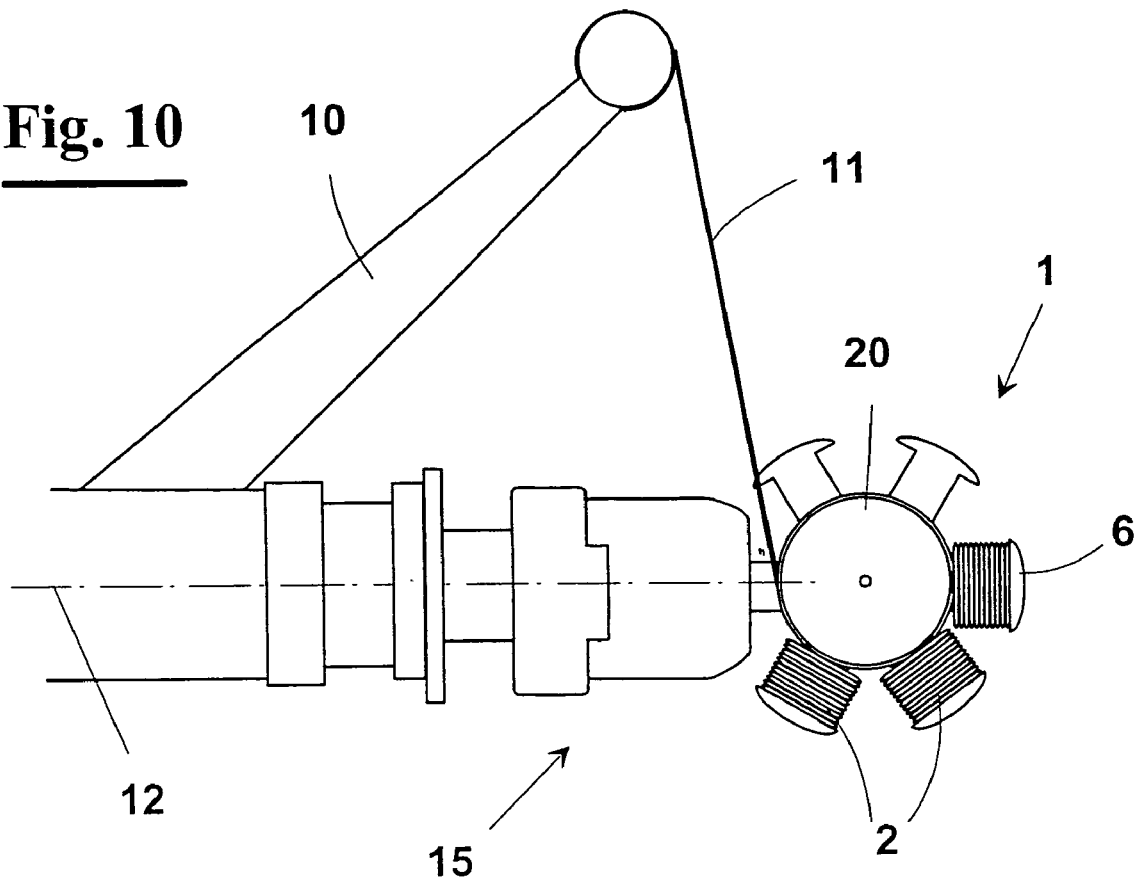
Figure 11:
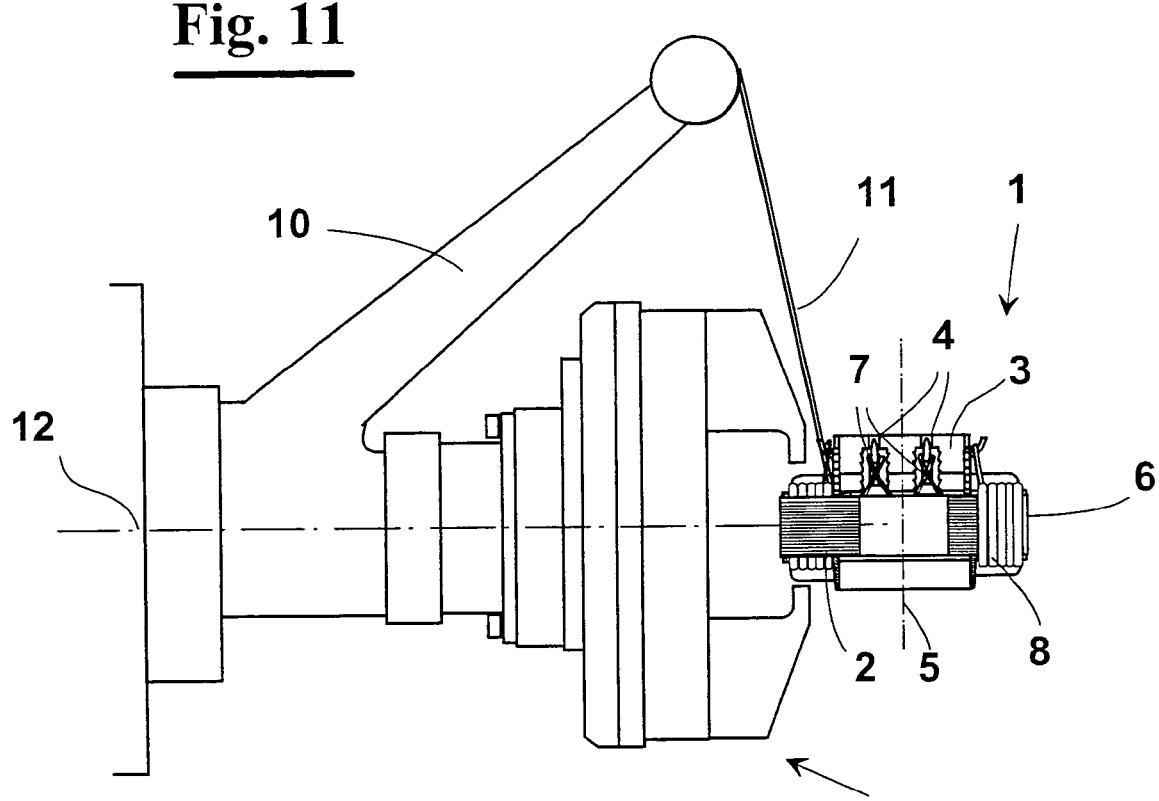

FIGS. 5 and 6 show, respectively, a side and a top plan view the withdrawal of shroud 15, after the first rotation of flier 10, which guides wire 11 up to depositing onto hook 4. The withdrawal disengages hook 4 from housing 17 of shroud 15 and, therefore, allows shield 20 to move between shroud 15 and hook 4 same. Then, as shown in FIGS. 7, 8, 9 and 10, wire 11, stretched by flier 10, is forced to pass under shield 20, with the result that wire 11 forms the loop 7 without disengaging from hook 4.

In FIGS. from 5 to 10, shield 20 is shown, according one exemplary embodiment, with a cylindrical shape co-axial to the stator, and moving axially.

Alternatively, the shield can have open shape, for example flat, but with at least a rounded edge, for allowing the wire 11 to slide and preventing, during the hooking step, wire 11 from being damaged by shield 20.

Figure 13:
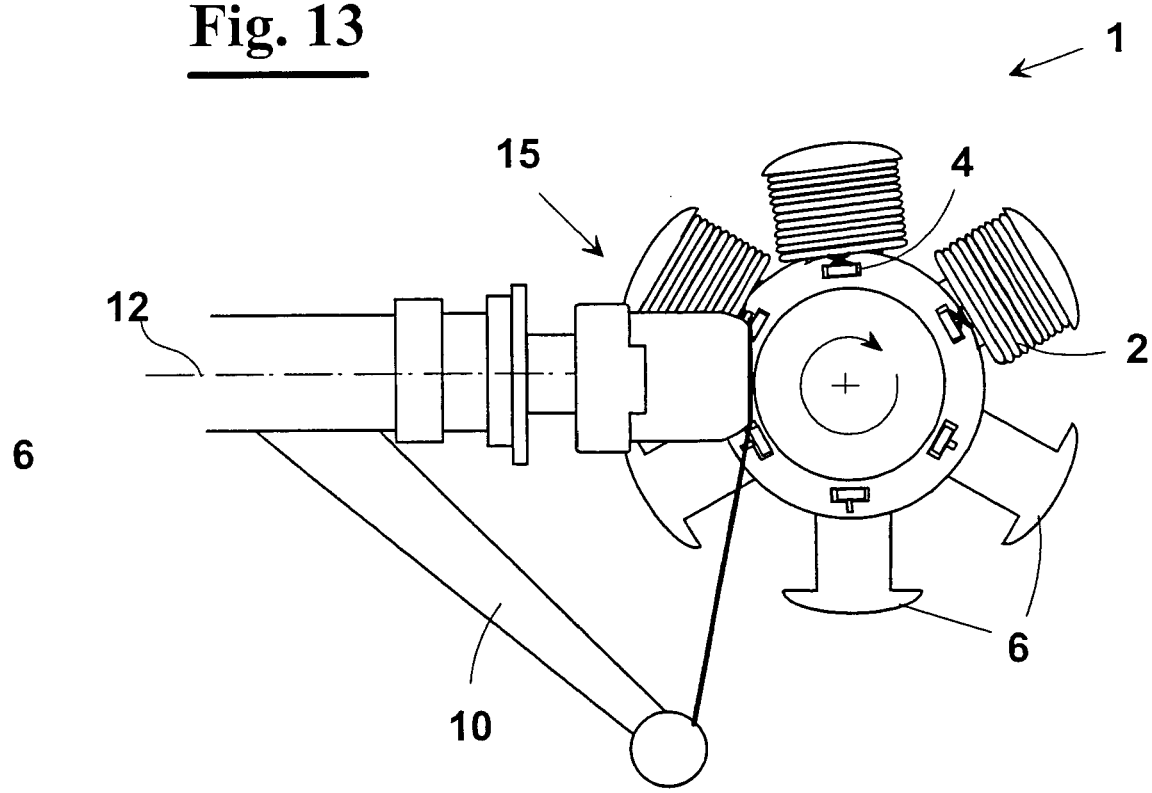
FIG. 13 is a top plan view of an alternative exemplary different embodiment of the method for winding a multi-pole stator.
Figure 14:
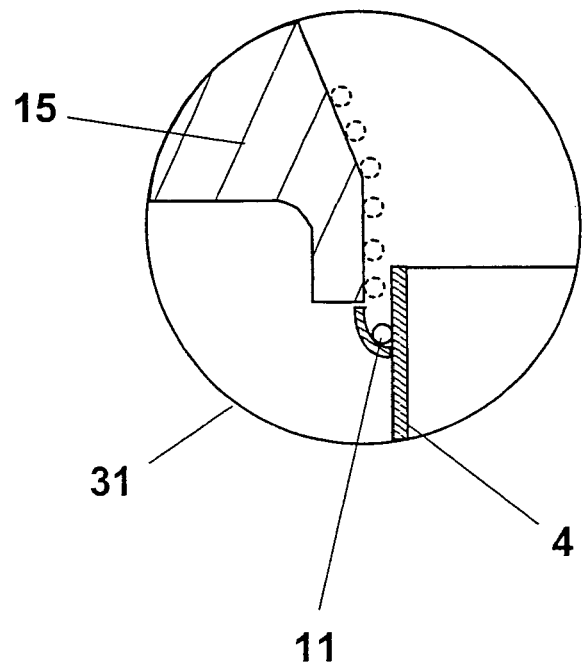
FIG. 14 shows in detail the relative position between shroud and hook for winding the multi-pole stator, according to an alternative exemplary embodiment of the invention.

With reference to FIGS. 13 and 14 an alternative exemplary embodiment of the invention, for winding wire 11 on pole 6 of stator 1 is obtained by a combination of movement of shroud 15 and flier 10, at the end of which shroud 15 is positioned so that the edge of shroud 15 same forms substantially a "slide" leading to the end of hook 4.

With a further combination of motion of shroud 15 and flier 10 the end of wire 11 is fixed to hook 4, since the "slide" forces wire 11 to follow predetermined trajectories that bring it to engage hook 4 according to a "Ω" or overturned U, an "alpha",etc.

Figure 15:
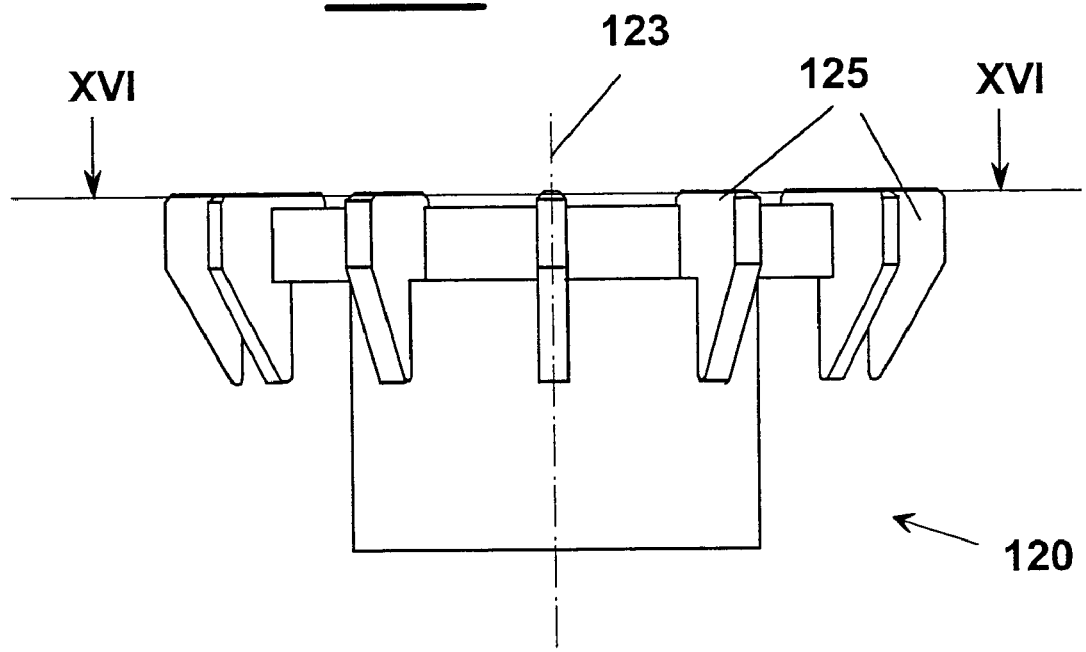
FIG. 15 shows an elevational front view of an exemplary embodiment of the shield shown in FIGS. from 5 to 10.
Figure 16:
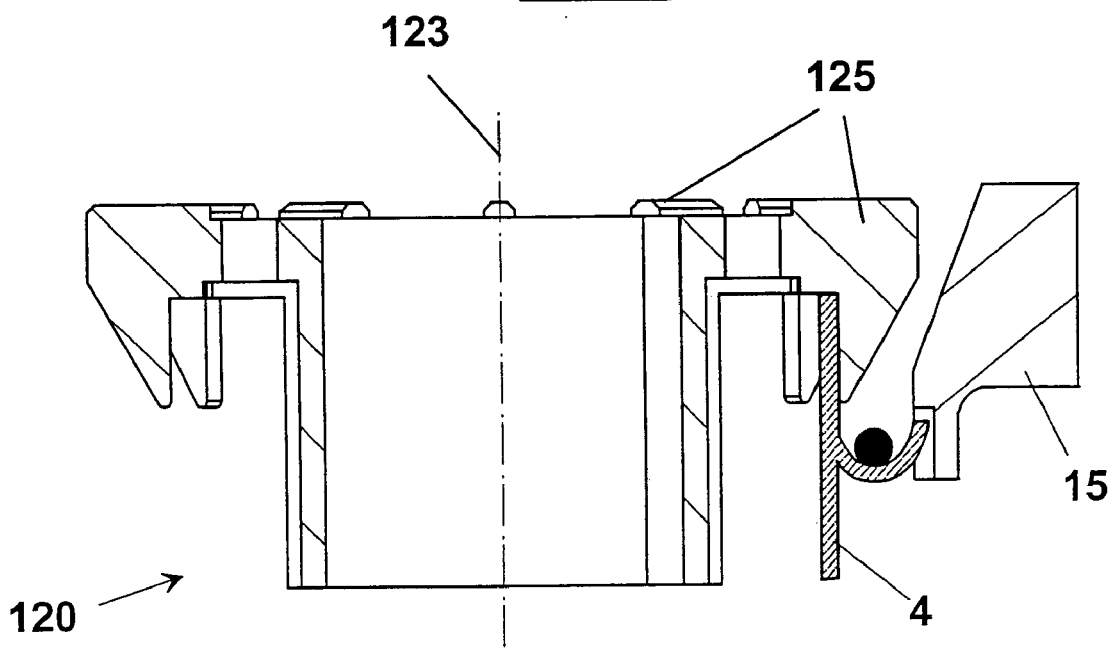
FIG. 16 shows a cross sectional view according to arrows XVI-XVI of the shield of FIG. 15.
Figure 17:
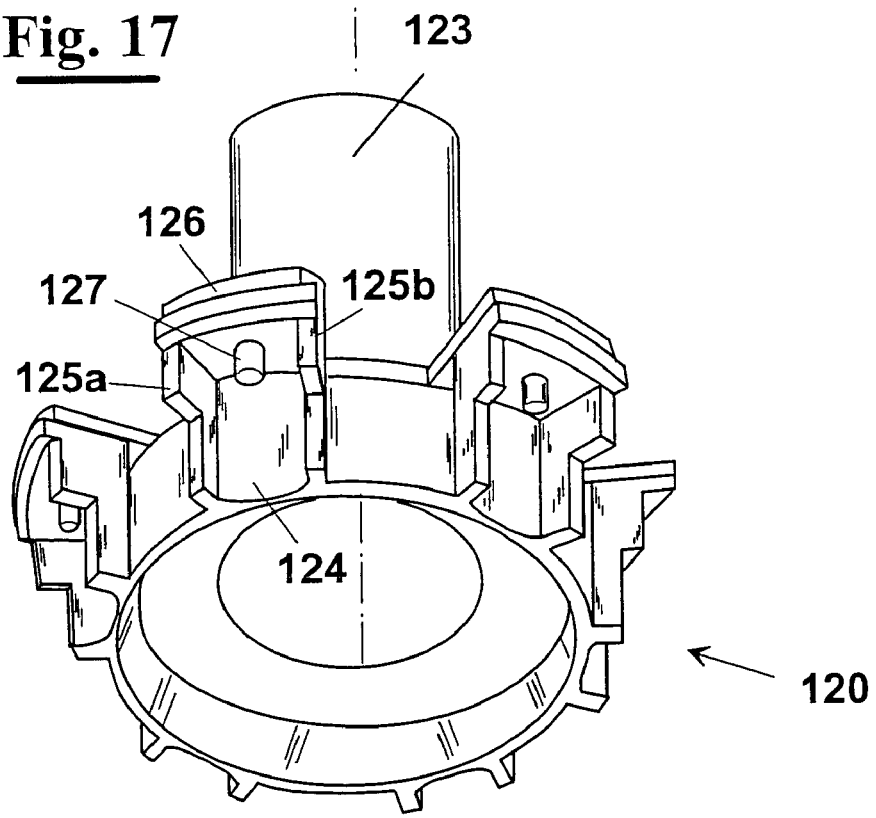
FIG. 17 shows a second alternative exemplary embodiment of the shield shown in FIGS. from 5 to 10.
Figure 18:
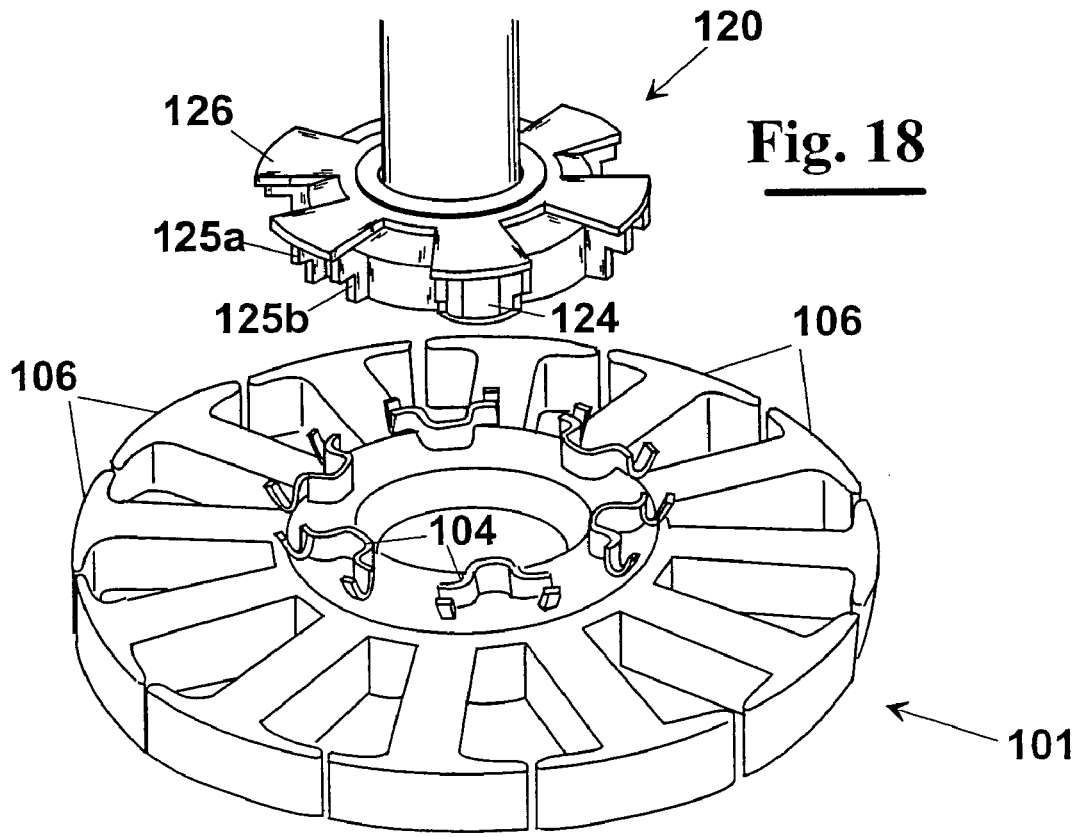
FIG. 18 shows the shield of FIG. 17 in a position of disengagement with respect to a multi-pole stator with "double hooks"

In a first alternative exemplary embodiment, shown in FIGS. 15 and 16, the shield 120 has cylindrical shape with axis 123 and from which a plurality of teeth 125 extend. They have a form suitable for engaging the hook 4 of stator 1 from the above, providing support and avoiding deformation and break of the hook owing to bending actions or hits which might occur at the winding and termination steps. Tooth 125 has a tip oriented towards below to provide a guiding surface to the wire 11.

In a second alternative exemplary embodiment, the locking element comprises a central stiffening portion 124 that backs the hook 104 and two side portions 125a and 125b suitable for blocking the hook 104 on the stator 101 and for guiding the wire during termination. In particular, this embodiment is advantageous in case of multi-pole stators 101 equipped with "double hooks" 104 each of which comprises two side hooks 104a and 104b connected by a central stiff portion (FIGS. 19 and 21).

As shown in detail in FIGS. 20 and 21, preferably a cross-sectional view and a perspective front view, the locking element has, furthermore, a protrusion or "tooth" 127. More in detail, in operative conditions the central stiff portion that connects the two hooks 104a and 104b is constrained between the central portion 124 of the locking element and the tooth 127 in order to limit further any possibility of movement. This way, it is possible to avoid that during the termination step the actions generated by the wire on the hook 104 can cause it to move away from a correct position or can damage it.

Figure 12:
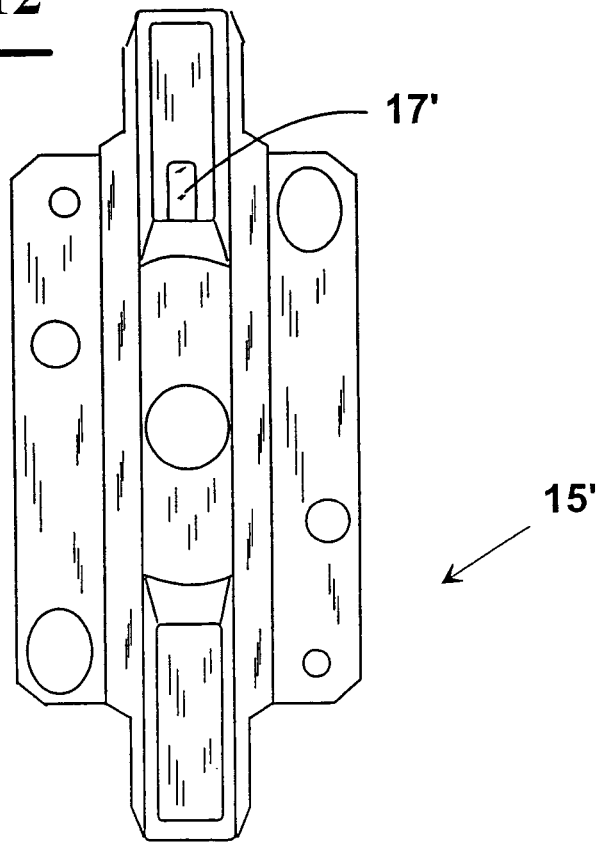
FIG. 12 shows an alternative exemplary different embodiment of the shroud of FIG. 1.

Notwithstanding in FIG. 1 a shroud 15 is shown formed by 2 semi-shrouds movable towards and away from each other, the invention can be applied also to coils with shrouds 15' as a single body, as shown in FIG. 12.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. An apparatus for winding multi-pole stators, wherein said stators are formed by a sheets stack ferromagnetic core, having an axis, a plurality of radially extending poles defining grooves between them, and a terminal board that coats in part the core and has a plurality of hooks; comprising at least one flier and at least one shroud that moves radially with respect to said stator overlapping a respective pole extension, wherein first and second portions of said shroud guide a wire during a winding of said wire about said pole and said second portion of said shroud directly guides said wire on said hook to terminate said wire onto said hook.

2. The apparatus of claim 1, wherein on said shroud, on a face oriented towards said stator, a housing is made suitable for receiving a portion of said hook, to make a guide for said wire on said hook.

3. The apparatus of claim 1, wherein said wire forms a loop or "alpha" about said hooks, further comprising: a movable shield arranged between a disengaged position and an engaged position between said hook and said shroud, suitable for keeping said wire at a forced position, for preventing said wire from disengaging from said hook when said flier moves backwards.

4. The apparatus of claim 3, wherein said shield, is arranged to cover said hooks during said termination, has cylindrical shape co-axial to said stator, and is arranged to move axially to said stator.

5. The apparatus of claim 3, wherein said shield, which covers said hooks during said termination, has open shape with at least a rounded edge, for allowing said wire to slide and preventing said wire from being damaged by said shield during said termination.

6. The apparatus of claim 1, further comprising a cylindrical shield peripherally equipped with at least a locking element that in use is arranged at a hook of said stator during termination.

7. The apparatus of claim 6, wherein said shield has a plurality of teeth oriented in an axial direction facing said stator for engaging and backing said hook, avoiding deformation and break of said hook owing to bending actions or hits which might occur at said winding and termination.

8. The apparatus of claim 6, wherein said locking element comprises a central stiffening portion that in use is positioned to back said hook and two side portions suitable for blocking said hook with respect to said stator and guiding said wire during termination.

9. The apparatus of claim 6, wherein said locking element has, furthermore, a protrusion or "tooth" so that said hook is constrained between said central stiffening portion and said tooth in order to limit further any possibility of movement.

* * * * *